(12) United States Patent
Lee et al.

(10) Patent No.: US 7,648,244 B2
(45) Date of Patent: Jan. 19, 2010

(54) ILLUMINATING UNIT AND PROJECTION-TYPE IMAGE DISPLAY APPARATUS EMPLOYING THE SAME

(75) Inventors: Kye-hoon Lee, Suwon-si (KR); Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 541 days.

(21) Appl. No.: 11/189,919

(22) Filed: Jul. 27, 2005

(65) Prior Publication Data

US 2006/0023449 A1 Feb. 2, 2006

(30) Foreign Application Priority Data

Jul. 27, 2004 (KR) ............... 10-2004-0058800

(51) Int. Cl.
| | |
|---|---|
| G03B 21/00 | (2006.01) |
| G03B 21/26 | (2006.01) |
| G03B 21/14 | (2006.01) |
| G03B 21/28 | (2006.01) |
| F21V 9/00 | (2006.01) |
| G02F 1/1335 | (2006.01) |
| B60Q 1/00 | (2006.01) |

(52) U.S. Cl. ................... 353/31; 353/94; 353/97; 353/98; 353/99; 349/5; 362/231; 362/519

(58) Field of Classification Search .......... 353/20, 353/31, 94, 97–99, 102, 119; 362/231
See application file for complete search history.

(56) References Cited

U.S. PATENT DOCUMENTS

| | | | | |
|---|---|---|---|---|
| 6,179,439 | B1 * | 1/2001 | Choate | 362/247 |
| 6,252,638 | B1 * | 6/2001 | Johnson et al. | 349/5 |
| 6,547,416 | B2 | 4/2003 | Pashley et al. | |
| 7,040,767 | B2 * | 5/2006 | Lee et al. | 353/99 |
| 7,048,385 | B2 * | 5/2006 | Beeson et al. | 353/97 |
| 7,303,291 | B2 * | 12/2007 | Ikeda et al. | 353/102 |
| 7,312,913 | B2 * | 12/2007 | Bierhuizen | 359/247 |
| 7,350,930 | B2 * | 4/2008 | Lee et al. | 353/98 |
| 2002/0114157 | A1 * | 8/2002 | Chuang et al. | 362/231 |
| 2004/0145910 | A1 * | 7/2004 | Lisowski | 362/519 |
| 2004/0263790 | A1 * | 12/2004 | VanOverloop et al. | 353/31 |

FOREIGN PATENT DOCUMENTS

JP 2002-100486 4/2002

(Continued)

*Primary Examiner*—Melissa J Koval
(74) *Attorney, Agent, or Firm*—Stanzione & Kim LLP (57) ABSTRACT

An illuminating unit with a compact design capable of improving collimating characteristics of beams emitted from a plurality of light sources positioned at different locations, and a projection-type image display apparatus employing the illuminating unit. The illuminating unit includes a base, a plurality of light sources to emit beams of different wavelength bands, and at least one color filter with a predetermined curvature to reflect one or more beams of predetermined wavelengths from among the beams emitted by the plurality of light sources such that the reflected one or more beams propagate in a first direction and to pass one or more remaining beams of other wavelength bands. The projection-type image display apparatus includes the illuminating unit, an optical integrator, an image-forming system, a beam splitter, and a projection lens.

13 Claims, 4 Drawing Sheets

FOREIGN PATENT DOCUMENTS

| | | |
|---|---|---|
| JP | 2003-298120 | 10/2003 |
| KR | 2001-22668 | 3/2001 |
| KR | 2003-7742 | 1/2003 |
| KR | 20-347602 | 4/2004 |
| KR | 2004-45434 | 6/2004 |

* cited by examiner

ILLUMINATING UNIT AND PROJECTION-TYPE IMAGE DISPLAY APPARATUS EMPLOYING THE SAME

CROSS-REFERENCE TO RELATED APPLICATIONS

This application claims priority from Korean Patent Application No. 2004-58800, filed on Jul. 27, 2004, in the Korean Intellectual Property Office, the disclosure of which is incorporated herein in its entirety by reference.

BACKGROUND OF THE INVENTION

1. Field of the Invention

The present general inventive concept relates to an illuminating unit to produce and emit a beam and a projection-type image display apparatus employing the same, and more particularly, to an illuminating unit with a compact design which is capable of improving collimating characteristics of beams emitted by a plurality of light sources at different locations within the illuminating unit, and a projection-type image display apparatus employing the same.

2. Description of the Related Art

In general, an illuminating unit including a non-point light source, such as light-emitting diodes (LEDs), and a reflector with a single curvature is used in an illuminating system for emitting uniform white light and collects a beam emitted by the non-point light source and directs the collected beam in one direction. The illuminating unit typically needs to project a collimated beam by focusing the beam emitted by the non-point light source. However, it is difficult to make the collimated beam using the illuminating unit.

Figure 1:
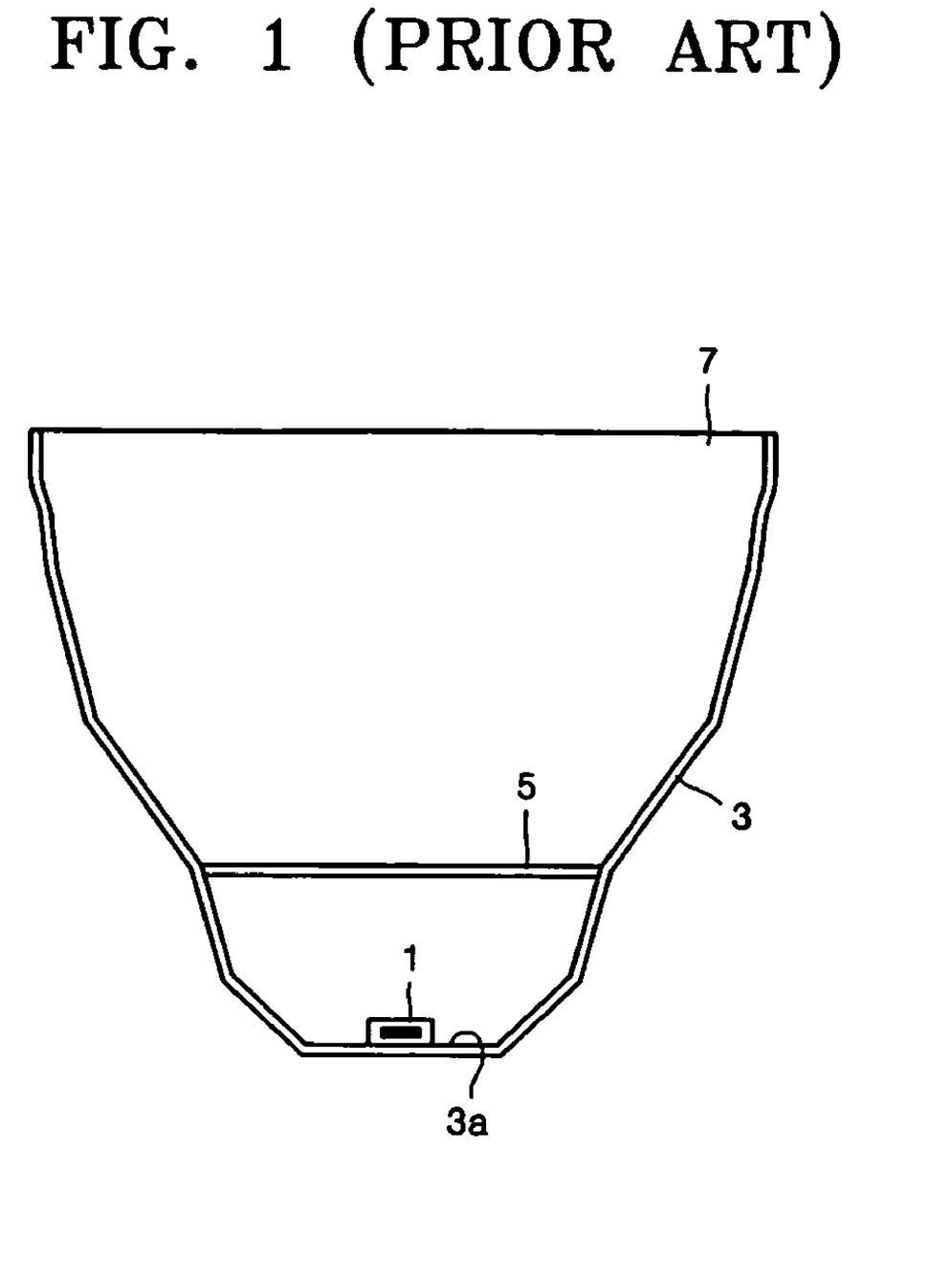
FIG. 1 is a schematic diagram illustrating a conventional illuminating unit.

Referring to FIG. 1, a conventional illuminating unit includes an LED package 1 that emits white light, a reflector 3 that reflects a beam emitted by the LED package 1, an entrance aperture 5, and an exit aperture 7. The LED package 1 is constructed to align red, green, and blue LED chips on one plane 3a of the reflector 3 to produce white light by combining beams emitted from the respective LED chips. The plane 3a is parallel to the entrance aperture 5 and the exit aperture 7.

Since the reflector 3 has a polygonal (approximately paraboloidal) cross-section, the beams reflected by the reflector 3 are allowed to exit the reflector 3 through the exit aperture 7 while maintaining good collimating characteristics and color uniformity.

The conventional illuminating unit including the reflector 3 having the polygonal cross-section is advantageous, since the polygonal cross section has improved collimating properties over other illuminating units including mirrors having a parabolic, spherical, or elliptical cross-section.

However, since the conventional illuminating unit having a polygonal reflector has a limitation on reducing its size, a beam spot produced by the conventional illuminating unit has a diameter that is not suitable for use in a projection-type image display apparatus. Thus, the conventional illuminating unit requires a separate focusing system when it is used in a projection-type image display apparatus. Another drawback exists in that it is difficult to realize a compact illuminating unit, since there is a limitation in reducing the size of a reflector.

SUMMARY OF THE INVENTION

The present general inventive concept provides an illuminating unit with a compact design which is capable of improving collimating characteristics of beams emitted from a plurality of light sources positioned at different locations within the illuminating unit. The present general inventive concept also provides a projection-type image display apparatus designed to provide uniform images and to reduce an overall size thereof by employing the illuminating unit having the compact design.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing an illuminating unit including: a base, a plurality of light sources that are positioned at different locations on the base to emit beams of different wavelength bands, and at least one color filter with a predetermined curvature to reflect one or more beams of predetermined wavelength bands from among the beams emitted by the plurality of light sources such that the reflected one or more beams propagate in a first direction and to pass one or more remaining beams of other wavelength bands. In the illuminating unit, the beams of different wavelength bands emitted by the plurality of light sources can be combined to emit a combination of the beams of different wavelengths in the first direction.

The foregoing and/or other aspects and advantages of the present general inventive concept are also achieved by providing a projection-type image display apparatus including the illuminating unit, an optical integrator to receive a collimated beam from the illuminating unit and to produce a uniform beam, an image-forming system to receive the uniform beam from the optical integrator and to produce an image by selectively reflecting the uniform beam, a beam splitter disposed in an optical path between the illuminating unit and the image-forming system to change the optical path of incident beams such that a beam incident from the illuminating unit is directed toward the image-forming system while a beam incident from the image-forming system is directed toward a screen, and a projection lens unit disposed adjacent to the beam splitter opposite the image-forming system to enlarge the image produced by the image-forming system and to project the enlarged image onto the screen.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
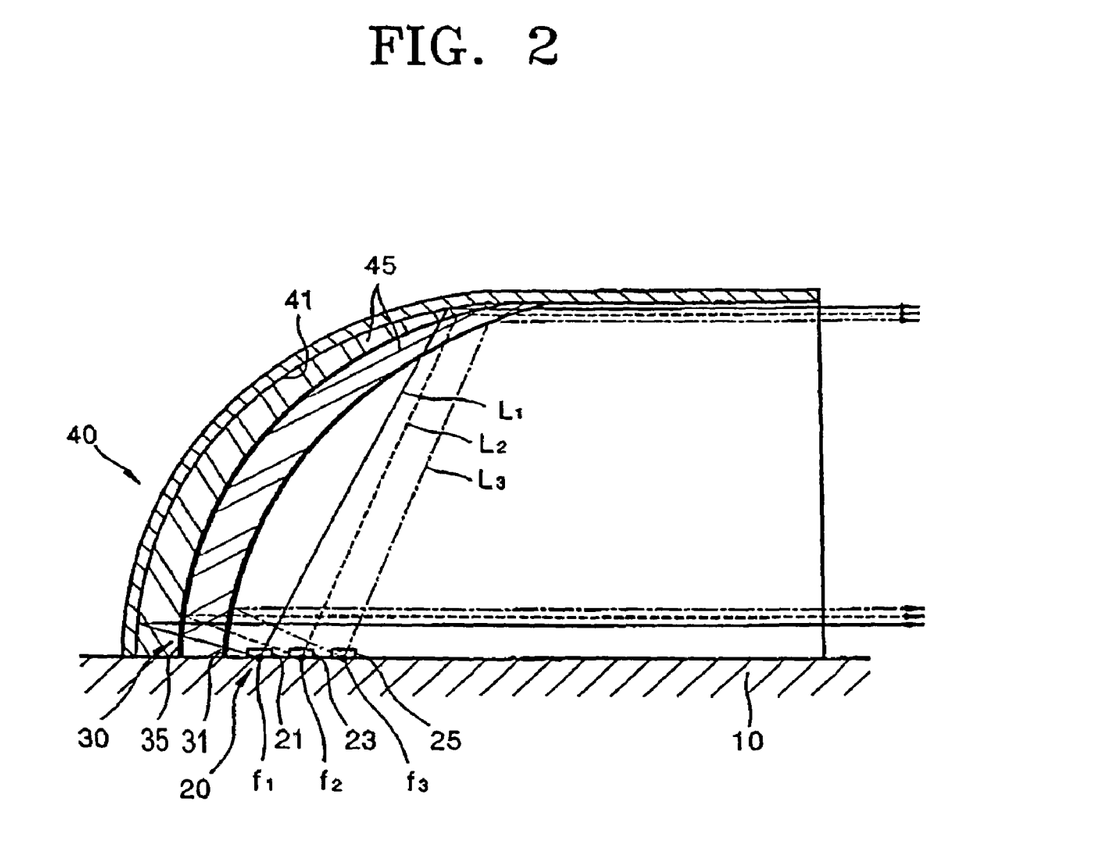
FIG. 2 is a cross-sectional view illustrating an illuminating unit according to an embodiment of the present general inventive concept.

Referring to FIG. 2, an illuminating unit according to an embodiment of the present general inventive concept includes a base 10, a plurality of light sources 20 that produce and emit a plurality of beams of different wavelength bands, and a color filter 30 that selectively reflects the plurality of beams according to wavelength band such that the reflected beams propagate in a first direction.

The plurality of light sources 20 may be organic light-emitting diodes (OLEDs) or LEDs made from semiconductor compounds and include first, second, and third light sources 21, 23, and 25 installed at different positions on the base 10. The first, second, and third light sources 21, 23, and 25 produce beams $L_1$, $L_2$, and $L_3$ of different wavelength bands, respectively, i.e., first, second, and third wavelengths, and emit the same at a predetermined radiation angle. For example, the first, second, and third light sources 21, 23, and 25 may produce beams of red, green, and blue wavelength bands, respectively. When the beams $L_1$, $L_2$, and $L_3$ emitted by the first, second, and third light sources 21, 23, and 25 are combined and the combination of the beams propagates in the same direction, white light is produced.

The color filter 30 can reflect one or more beams of specific wavelength bands among the beams $L_1$, $L_2$, and $L_3$ emitted by the plurality of light sources 20 such that the reflected one or more beams propagate toward the first direction while passing one or more remaining beams of other wavelength bands. The color filter 30 has a predetermined curvature to ensure that the reflected one or more beams are parallel to the first direction. The color filter 30 has a parabolic shape such that a beam incident from one of the plurality of light sources 20 disposed at a corresponding focal point is reflected therefrom parallel to the first direction. The color filter 30 can include first and second parabolic color filters 31 and 35, and the first direction may be parallel to the base 10.

The first color filter 31 reflects the beam $L_3$ and passes the beams $L_1$ and $L_2$. Since the third light source 25 is positioned at focal point $f_3$ of the first color filter 31, the beam $L_3$ emitted by the third light source 25 is reflected by the first color filter 31 and propagates toward the first direction along a path that is parallel to the base 10.

The second color filter 35 is disposed on a rear side of the first color filter 31 and reflects the beam $L_2$ that is one of the beams $L_1$ and $L_2$ that passes through the first color filter 31 while passing the other beam $L_1$. Since the second light source 23 is positioned at focal point $f_2$ of the second color filter 35, the beam $L_2$ emitted by the second light source 23 is reflected by the second color filter 35 that it is parallel to the base 10 (i.e., in the first direction). The beam $L_2$ is reflected by the second color filter 35 and then passes back through the first color filter 31 such that the beam $L_2$ propagates along the same path as the beam $L_3$ that is reflected by the first color filter 31 (i.e., in the first direction).

An optical element with a parabolic reflecting surface may be used to allow the beam L, that passes through both the first color filter 31 and the second color filter 35 to propagate along the same path as the beams $L_2$ and $L_3$ (i.e., in the first direction). The optical element may be a separate color filter (not shown) that reflects only the beam $L_1$ and/or a reflector 40 (to be described below).

As illustrated in FIG. 2, the illuminating unit may include the reflector 40 that is disposed on the base 10 to cover the plurality of light sources 20 and accommodates the color filter 30. The reflector 40 has a parabolic reflecting surface 41 from which the beam L, that passes through the color filter 30 is reflected. The reflecting surface 41 is positioned at the rear side of the second color filter 35 opposite to the first color filter 31. Since the first light source 21 is positioned at focal point f, of the reflecting surface 41, the beam L, reflected from the reflecting surface 41 is collimated and propagates along the same path as the beams $L_2$ and $L_3$ (i.e., the first direction) after passing back through the first and second color filters 31 and 35.

As illustrated in FIG. 2, the illuminating unit may further include a transparent member 45 that is disposed in spaces between the first and second color filters 31 and 35 and between the second color filter 35 and the reflecting surface 41. The transparent member 45 passes incident beams and allows the first and second color filters 31 and 35 to maintain their parabolic shape and to be housed within the reflector 40.

The illuminating unit allows beams of different wavelengths emitted by the plurality of light sources 20 placed at different positions along the base 10 to be selectively passed or reflected by the parabolic color filter 30 and to propagate along the same path in a collimated fashion. Thus, it becomes possible to produce white light by combining the beams of different wavelengths.

Figure 3:
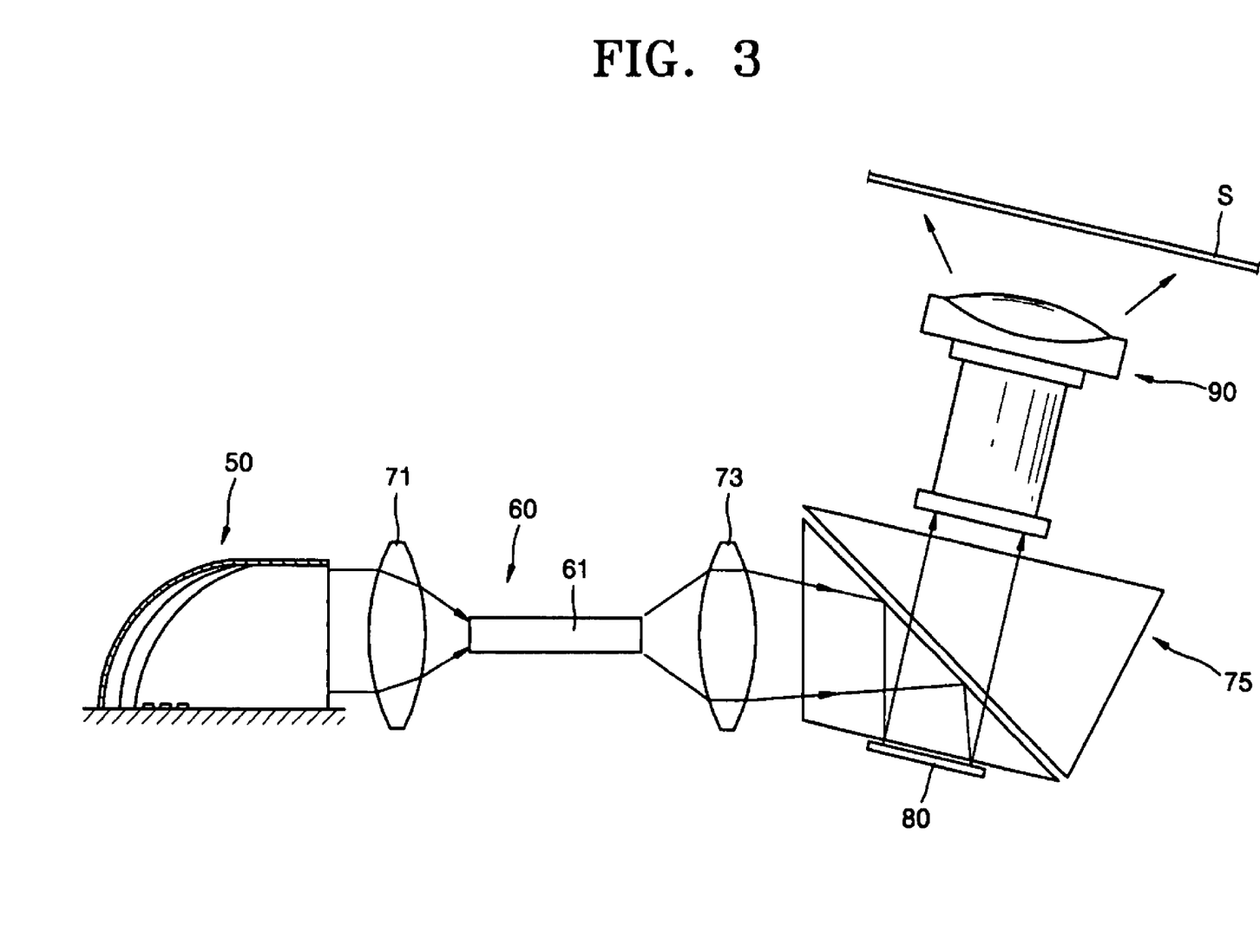
FIG. 3 illustrates an optical arrangement of a projection-type image display apparatus according to an embodiment of the present general inventive concept.
Figure 4:
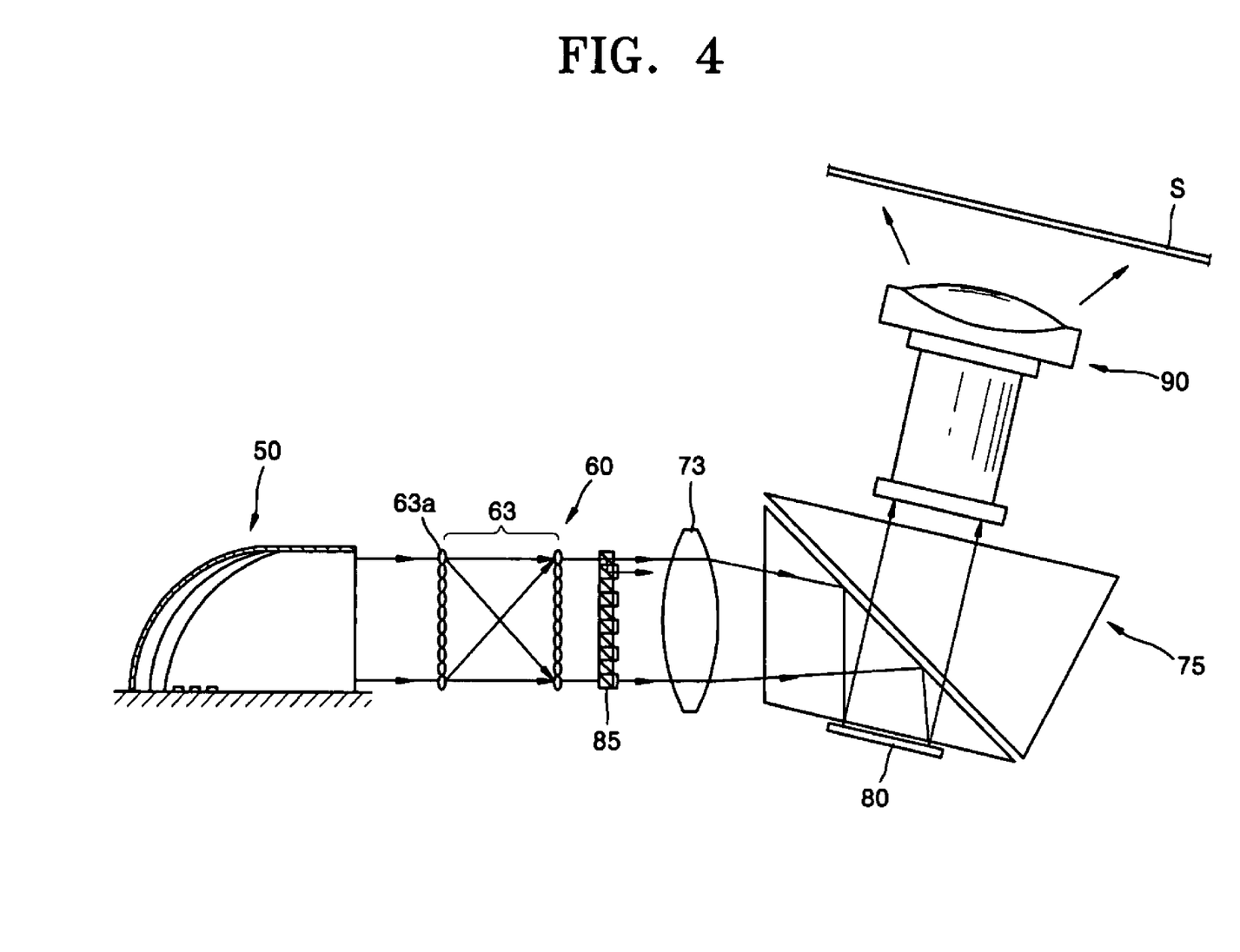
FIG. 4 illustrates an optical arrangement of a projection-type image display apparatus according to another embodiment of the present general inventive concept.

FIG. 3 illustrates an optical arrangement of a projection-type image display apparatus according to an embodiment of the present general inventive concept. FIG. 4 illustrates an optical arrangement of a projection-type image display apparatus according to another embodiment of the present general inventive concept. Referring to FIGS. 3 and 4, the projection-type image display apparatuses each include an illuminating unit 50, an optical integrator 60 that produces a uniform beam from a beam incident from the illuminating unit 50, an image-forming system 80, a beam splitter 75 that changes a propagation path of an incident beam, and a projection lens unit 90. The illuminating unit 50 produces and emits a collimated beam in a direction of the optical integrator 60. Since the structure of the illuminating unit 50 is substantially the same as the illuminating unit illustrated in FIG. 2, a detailed description thereof will not be provided.

A plurality of light sources in the illuminating unit 50 are sequentially turned on or off to sequentially emit beams of red, green, and blue wavelengths. Thus, in a projection-type image display apparatus employing a single-panel image-forming system, the illuminating unit 50 may create color images without a color wheel (not shown) conventionally used for creating color images.

Referring to FIG. 3, the optical integrator 60 can be made of a rod 61 having a higher refractive index than a refractive index of air. The rod 61 may be a glass rod and produces a uniform beam by totally internally reflecting an incident beam within the rod 61. A condenser lens 71 is disposed between the illuminating unit 50 and the rod 61 to collect the beam emitted by the illuminating unit 50.

Referring to FIG. 4, the optical integrator 60 may include a fly-eye lens array 63 comprised of two lenses, either having a plurality of fly eyes or cylindrical lens cells 63a that are disposed adjacent to one another. The fly-eye lens array 63 may be comprised of two or more lenses.

Referring to FIGS. 3 and 4, a relay lens 73 may be disposed in an optical path between the optical integrator 60 and the beam splitter 75 to relay an incident beam so that it is focused onto the image-forming system 80.

The image-forming system 80 produces an image by selectively reflecting the uniform beam transmitted from the optical integrator 60. The image-forming system 80 may comprise a reflective liquid crystal display (LCD) or a digital micromirror device (DMD). The reflective LCD produces an image using polarization characteristics of an incident beam, i.e., a beam with a specific polarization. Referring to FIG. 4, when the reflective LCD is used, the projection-type image display apparatus may further include a polarization converting system (PCS) 85 disposed in an optical path between the optical integrator 60 and the beam splitter 75. The PCS 85 transforms incident non-polarized light into light with specific polarization with little optical loss. Thus, using the PCS 85 can improve optical efficiency. The DMD is a two-dimensional array of independently driven micromirrors and produces an image by independently setting an angle of reflection for each pixel according to an incoming image signal.

Referring to FIGS. 3 and 4, the beam splitter 75 is disposed in an optical path between the illuminating unit 50 and the image-forming system 80 and changes the path of incident beams so that a beam incident from the illuminating unit 50 is directed toward the image-forming system 80 and a beam incident from the image-forming system 80 is directed toward a screen S. Thus, the beam splitter 75 can reflect a beam received from the illuminating unit 50 and pass a beam received from the image-forming system 80. The beam splitter 75 may be a critical-angle prism that changes the path of an incoming beam using a critical angle, a typical beam splitter that splits an incident beam with a predetermined splitting ratio, or a polarization beam splitter that changes the path of an incoming beam depending on its polarization.

The projection lens unit 90 is disposed adjacent to the beam splitter 75 opposite the image forming system 80 and enlarges the image created by the image-forming system 80 that passes through the beam splitter 75 and projects the enlarged image onto the screen S.

An illuminating unit according to the present general inventive concept is capable of producing and emitting collimated light using a compact light source and a parabolic color filter. Another advantage of the present general inventive concept is to achieve a compact design by reducing the overall size and improve optical efficiency.

A projection-type image display apparatus according to the present general inventive concept can reduce the overall size by employing the compact illuminating unit. The apparatus can also produce an image using collimated light so as to enlarge the image at a constant ratio for projection onto a screen, thereby achieving enhanced image quality.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A projection-type image display apparatus, comprising:
   an illuminating unit to produce a collimated light beam from a plurality of light sources that emit beams of different wavelength bands;
   an optical integrator to receive the collimated light beam from the illuminating unit and to produce a uniform beam;
   an image-forming system to receive the uniform beam from the optical integrator and to produce an image by selectively reflecting the uniform beam;
   a beam splitter disposed in an optical path between the illuminating unit and the image-forming system to change the optical path of incident beams such that a beam incident from the illuminating unit is directed toward the image-forming system while a beam incident from the image-forming system is directed toward a screen; and
   a projection lens unit disposed adjacent to the beam splitter and opposite to the image-forming system to enlarge the image produced by the image-forming system and to project the enlarged image onto the screen,
   wherein the illuminating unit comprises:
      a base having the plurality of light sources positioned at different locations thereon;
      at least one color filter with a predetermined curvature to reflect one or more beams of predetermined wavelength bands from among the beams emitted by the plurality of light sources such that the reflected one or more beams propagate in a first direction and to pass one or more remaining beams of other wavelength bands; and
      a reflector disposed on the base to cover the plurality of light sources and to accommodate the at least one color filter and having a reflecting surface to reflect the remaining one or more beams that pass through the at least one color filter in the first direction.

2. The apparatus of claim 1, wherein:
   the plurality of light sources comprises a first light source to emit a first beam in a first wavelength band, a second light source to emit a second beam in a second wavelength band, a third light source to emit a third beam in a third wavelength band;
   the at least one color filter comprises a first color filter to reflect the first beam while passing the second beam and the third beam and a second color filter disposed between the first color filter and the reflecting surface of the reflector to reflect the second beam while passing the third beam; and
   the reflecting surface of the reflector reflects the third beam back through the first and second color filters such that the first and second beams reflected by the first and second color filters and the third beam reflected by the reflecting surface are combined to propagate along the same path in the first direction.

3. The apparatus of claim 2, wherein the illuminating unit further comprises:
   a transparent member disposed in spaces between the first and second color filters and between the second color filter and the reflecting surface to support the first and second color filters and to pass the first, second, and third beams.

4. A projection type display apparatus, comprising:
   an illumination unit, comprising:
   a housing having a reflective inner surface and an aperture opposite the reflective inner surface,
   a non-point light source disposed within the housing to emit light toward the reflective inner surface, and
   a filter disposed between the non-point light source and the reflective inner surface and having a predetermined curvature to reflect a first portion of the light emitted toward the aperture to be collimated with a second portion of the light emitted that passes through the filter and is reflected toward the aperture by the reflective inner surface of the housing; and
   image processing optics to process a collimated beam received from the illumination unit into an image and to project the image onto a display screen.

5. The apparatus of claim 4, wherein the image processing optics receives the collimated beam along a first axis and projects the image onto the screen along a second axis having a predetermined angle with the first axis.

6. The apparatus of claim 4, wherein the image processing optics comprises:
- an optical integrator to receive the collimated beam from the illumination unit and to produce a uniform beam;
- bending optics to bend an optical path of the uniform beam received from the optical integrator;
- an image-forming system to create an image from the uniform beam received from the bending optics; and
- a projection lens to enlarge the image created by the image-forming system and to project the enlarged image onto the display screen.

7. The apparatus of claim 6, wherein the bending optics comprises:
- a beam splitter disposed between the projection lens and the image forming system to selectively pass and reflect beams from the image-forming system and the optical integrator, respectively.

8. The apparatus of claim 6, wherein the optical integrator comprises a transmissible rod having a refraction index less than a refraction index of air.

9. The apparatus of claim 6, wherein the optical integrator comprises a fly-eye lens array.

10. The apparatus of claim 6, wherein the image forming processing optics further comprises:
- a collecting lens disposed between the illumination unit and the optical integrator to collect the collimated beam from the illumination unit and to provide the collected beam to the optical integrator; and
- a relay lens disposed between the optical integrator and the bending optics to relay the uniform beam from the optical integrator to the bending optics.

11. The apparatus of claim 6, wherein the optical integrator comprises a polarization converting system to create a specific polarization in the uniform beam produced by the optical integrator.

12. The apparatus of claim 6, wherein the image-forming systemcomprises one of a reflective liquid crystal display device and a digital mirror display device.

13. A projection-type display apparatus comprising an illumination unit, the illumination unit comprising:
- a light source to emit light;
- a reflector to reflect emitted light toward an aperture of the illumination unit; and
- a filter disposed between the light source and the reflector and having a predetermined curvature to reflect a first portion of the emitted light toward the aperture and to pass a second portion of the emitted light to the reflector to reflect the second portion of emitted light toward the aperture in collimation with the first portion of reflected light.

* * * * *

UNITED STATES PATENT AND TRADEMARK OFFICE
CERTIFICATE OF CORRECTION

PATENT NO. : 7,648,244 B2  
APPLICATION NO. : 11/189919  
DATED : January 19, 2010  
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1078 days.

Signed and Sealed this

Twenty-eighth Day of December, 2010

David J. Kappos  
*Director of the United States Patent and Trademark Office*